(12) United States Patent
Gotoh

(10) Patent No.: US 6,223,300 B1
(45) Date of Patent: Apr. 24, 2001

(54) DISK ARRAY APPARATUS

(75) Inventor: Mitsuo Gotoh, Kanagawa-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/182,373

(22) Filed: Oct. 29, 1998

(30) Foreign Application Priority Data

Nov. 21, 1997 (JP) .................................................. 9-321292

(51) Int. Cl.⁷ .................................................. G06F 11/00
(52) U.S. Cl. .................................................. 714/5; 711/114
(58) Field of Search .................................. 714/5, 6, 7, 13, 714/15, 20, 25, 39, 42, 47, 723, 763, 770; 711/114, 115, 100, 133, 173

(56) References Cited

U.S. PATENT DOCUMENTS

| | | | | |
|---|---|---|---|---|
| 5,408,644 | * | 4/1995 | Schneider et al. | 395/575 |
| 5,511,227 | | 4/1996 | Jones | 395/829 |
| 5,559,956 | * | 9/1996 | Sukegawa | 395/182.06 |
| 5,574,851 | | 11/1996 | Rathunde | 395/182.05 |
| 5,619,690 | * | 4/1997 | Matsumani et al. | 395/616 |
| 5,724,539 | * | 3/1998 | Riggle et al. | 395/427 |
| 5,765,204 | * | 6/1998 | Bakke et al. | 711/202 |
| 5,809,224 | * | 9/1998 | Schultz et al. | 395/182.05 |
| 5,950,230 | * | 9/1999 | Islam et al. | 711/156 |
| 5,961,652 | * | 10/1999 | Thompson | 714/6 |
| 6,058,455 | * | 5/2000 | Islam et al. | 711/114 |
| 6,058,489 | * | 5/2000 | Schultz et al. | 714/7 |

FOREIGN PATENT DOCUMENTS

| | | |
|---|---|---|
| 8328759 | 12/1996 | (JP) . |
| WO 97/07461 | 2/1997 | (WO) . |

OTHER PUBLICATIONS

XP–002144050; Gerhard Weikum and Peter Zabback; Tuning of Striping Units in Disk–Array–Based File Systems; Department of Computer Science Information Systems–Databases; Feb. 2, 1992, pp. 80–86.

\* cited by examiner

Primary Examiner—Nadeem Iqbal
(74) Attorney, Agent, or Firm—Brinks Hofer Gilson & Lione

(57) ABSTRACT

A disk array apparatus is provided which, without stopping its host system, reconstructs data areas of its configured storage devices by determining optimum array parameters in keeping with disk access trends. Each of the storage devices includes a data area furnished in units of a stripe size, a log storage area for storing access logs, and a work area in which to change the data area. The inventive apparatus comprises: an access log storing means for storing access logs to the log storage areas; an access log analyzing means for analyzing trends of access to the storage devices based on the access logs; an array parameter judging and changing means for judging the validity of array parameters based on the result of the analyses and for setting optimum array parameters anew as needed; and a reconstructing means for reconstructing the data areas as per the changed array parameters.

4 Claims, 7 Drawing Sheets

FIG. 4
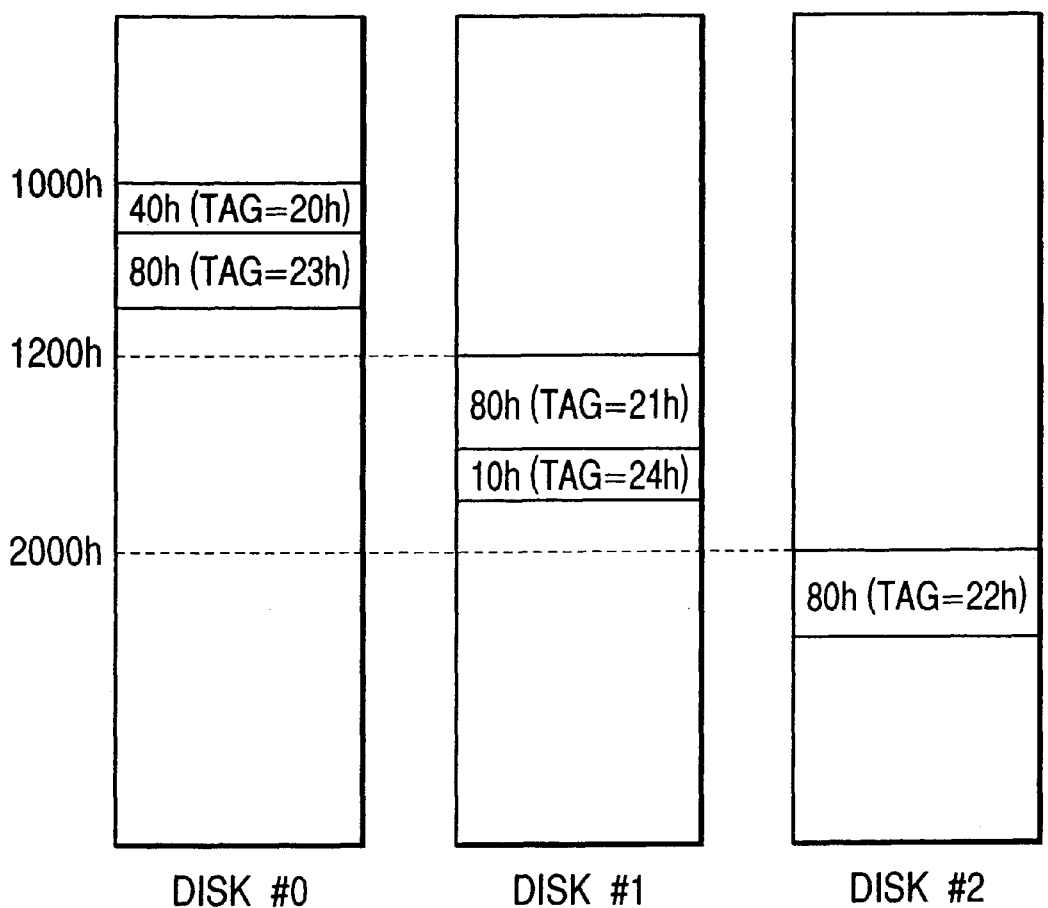
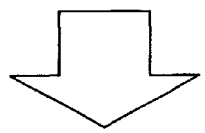
RESULTS OF ANALYSIS : THE STRIPE IS IDEAL IF ITS
SIZE IS AT LEAST 64KB
- PARALLEL ACCESS TO DISKS  ⟶ OK
  IS ACCEPTABLE
- ACCESS TO CONTINUOUS REGIONS  ⟶ OK
  ON DISK IS ACCEPTABLE

DISK ARRAY APPARATUS

BACKGROUND OF THE INVENTION

1. Field of the Invention

The present invention relates to a disk array apparatus comprising storage devices and, more particularly, to a disk array apparatus capable of changing a previously established array parameter in accordance with logs of past access to the storage devices so that data areas in the storage devices are reconstructed.

2. Description of the Related Art

There have been developed disk array apparatuses each connecting a plurality of hard disk drives (simply called disks hereunder) through a parallel interface to constitute a mass storage disk subsystem that may be accessed rapidly for enhanced storage device performance.

In such a disk array apparatus, data are stored in a distributed manner throughout the configured disks for parallel high-speed access. If a parity disk is provided, a failed disk may be remedied by resorting to parity information. That is, the faulty disk may be removed and replaced on a hot-line basis by a new disk, whereby the data held on the defective disk are recovered.

Where a spare disk is provided for use in an emergency, the data stored on a failed disk may be created anew on the spare disk. The faulty disk is then isolated from the system.

In the conventional disk array apparatus, the data area in each of the configured disks is managed in units of stripes so that the disks are accessed in parallel. More specifically, the data area is managed in units of segments corresponding to continuous address locations.

In that setup, as shown in FIG. 7A, a mass read or write instruction is processed at high speed through parallel access to a plurality of disks. Or as shown in FIG. 7B, separate read or write instructions from a plurality of applications are distributed to the suitable disks for high-speed parallel processing.

In conventional disk array apparatuses, once the disk subsystem is configured, array parameters such as disk stripe sizes are rarely altered from initially established value in keeping with use frequency or the like. It follows that the parameters set for access to the configured disks may not necessarily remain optimal.

The trends of access to the configured disks vary significantly depending on the application type, data sizes, the number of clients, use frequency and other factors. In fact, it is not very probable that the initially established array parameters such as the stripe size, disk count and RAID level would remain valid for an extended period of time. The efficiency of access to disks has often deteriorated during system operation.

Illustratively, it often happens that, as shown in FIG. 8A, a plurality of processing instructions of large access sizes cannot be processed in parallel and that, as depicted in FIG. 8B, requests of small access sizes concentrated on a specific disk may prevent parallel access thereto.

Despite those problems, few attempts have been made to alter the initially established array parameters such as the stripe size in conventional disk array apparatuses.

If the stripe size were to be changed, the host system of the disk array apparatus would have to be stopped for an appreciably long period of time to make backup copies of necessary data. With the old stripe size replaced by a new stripe size, the backup copies must be restored.

It would also be necessary to check the validity of the stripe size by retrieving access logs from the apparatus for manual analyses. The analyses can amount to a time-consuming, labor-intensive process. Sometimes there were no means to retrieve the access logs.

SUMMARY OF THE INVENTION

It is therefore an object of the present invention to provide a disk array apparatus which, without stopping its host system, allows an optimum array parameter to be determined in keeping with disk access trends so that data areas in configured storage devices such as disks are reconstructed accordingly.

Further objects, features and advantages of this invention will become more apparent upon a reading of the following description and appended drawings.

BRIEF DESCRIPTION OF THE DRAWINGS

FIG. 4 is another explanatory view of typical access logs used by the embodiment;

DETAILED DESCRIPTION OF THE PREFERRED EMBODIMENTS

One preferred embodiment of this invention will now be described with reference to FIGS. 1 through 6.

Figure 1:
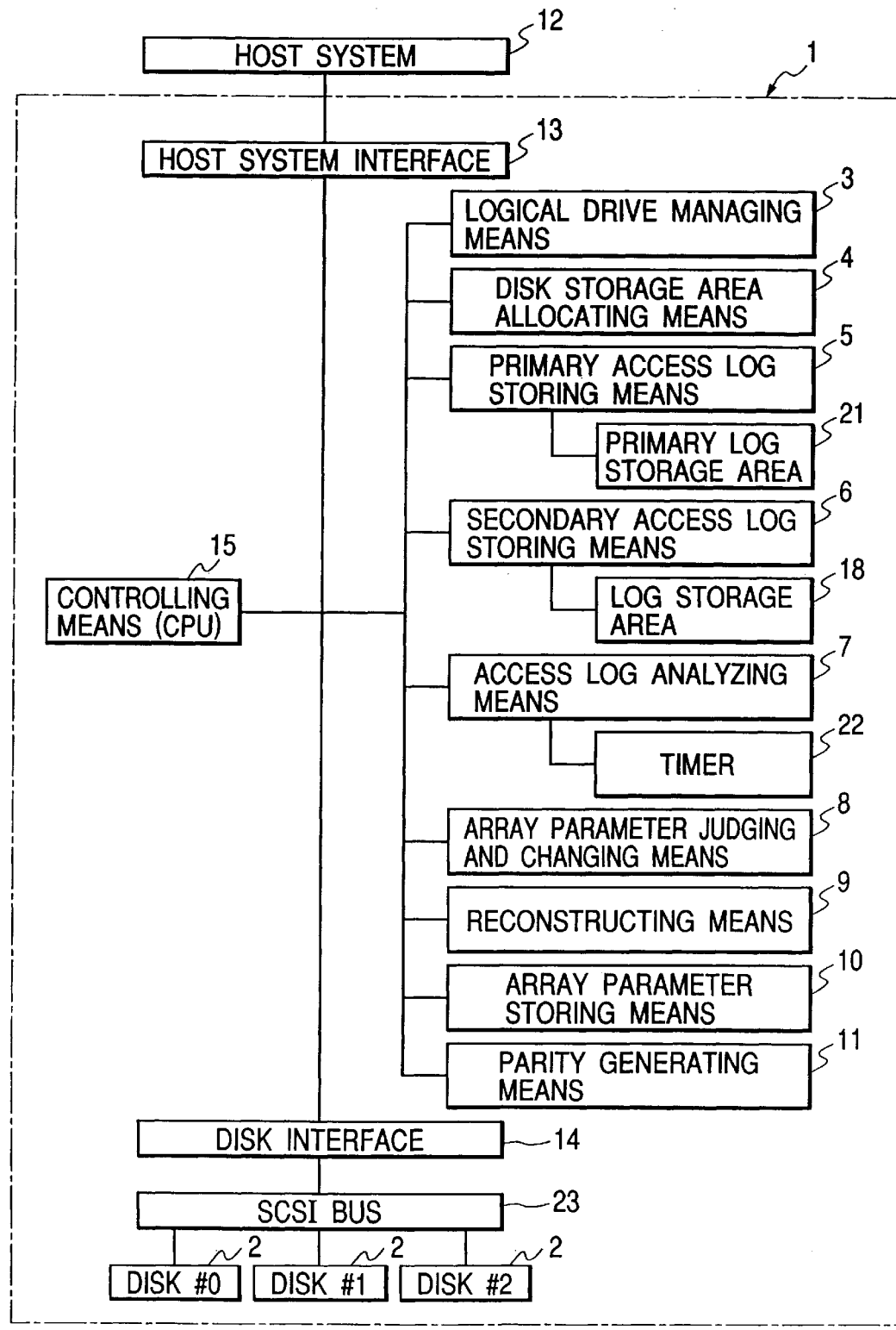
FIG. 1 is a block diagram of a disk array apparatus embodying this invention.

As shown in FIG. 1, a disk array apparatus 1 embodying the invention comprises: a disk group 2 illustratively made up of a plurality of disks #0, #1 and #2 as storage devices; logical drive managing means 3 for managing logical drives of the disks #0, #1 and #2; disk storage area allocating means 4 for determining which stripes are to be accessed on the disks #0, #1 and #2; primary access log storing means 5 for storing on a primary basis access logs, i.e., chronologically arranged records of use status and processing details of the disks #0, #1 and #2 into a primary log storage area 21; secondary access log storing means 6 for recording on a secondary basis the primarily retained access logs from the primary access log storing means 5 to a log storage area 18 of the disks #0, #1 and #2; access log analyzing means 7 for analyzing the contents of the access logs retrieved from the disks #0, #1 and #2 at predetermined log cycles or in accordance with a user instruction; array parameter judging and changing means 8 for judging the validity of array parameters based on the result of analyses by the access log analyzing means 7 and, if any array parameter is judged invalid, for changing that array parameter; reconstructing means 9 for reconstructing the logical disks #0, #1 and #2 based on the changed array parameters; array parameter storing means 10 for recording the newly established array parameters to a nonvolatile memory; parity generating means 11 for generating new parity when a new stripe size is set; a host system 12; a host system interface 13 which interfaces between the host system 12 and the disk array apparatus 1; a disk interface 14 interfacing access to the disk group 2; and controlling means 15 such as a CPU for providing integrated control on all operations of the above components.

The components outlined above will now be described in more detail.

The disks #0, #1 and #2 in the disk group 2 are nonvolatile, writable mass storage devices in which addresses are established randomly. These devices may be implemented illustratively in the form of magnetic disks, optical disks or semiconductor disks.

Although the disk group 2 of this embodiment is shown comprising three disks #0, #1 and #2, this is not limitative of the invention. Alternatively, there may be two disks or three or more disks configured.

Figure 2:
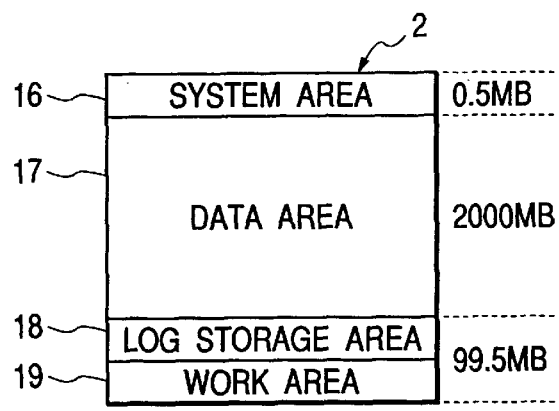
FIG. 2 is an explanatory view of storage areas on each disk in the embodiment.

As shown in FIG. 2, each of the disks #0, #1 and #2 comprises: a system area 16 for storing management information about the disks #0, #1 and #2; a data area 17 established in units of a stripe size; a log storage area 18 for storing logs of access to the disks #0, #1 and #2; and a work area 19 in which to manipulate data when the logical disks #0, #1 and #2 are to be reconstructed.

If the disks #0, #1 and #2 have a total capacity of 2.1 GB (gigabytes) each, then the system area 16 has 0.5 MB (megabytes), the data area 17 has 2,000 MB, and the log storage area 18 and work area 19 have 99.5 MB altogether. When the system area 16, log storage area 18 and work area 19 are predetermined in this manner, the host system 12 has no difficulty recognizing these components smoothly so that access logs are recorded cyclically.

Although the log storage area 18 and work area 19 of this embodiment are established separately, this is not limitative of the invention. The two areas may instead be set up in one region on each of the disks #0, #1 and #2.

If the log storage area 18 and work area 19 are formed in the same region, once the access log analyzing means 7 has finished analyzing access trends (to be described later), the access logs may be erased from the log storage area 18. The vacated area may then be used as an additional area supplementing the work area 19. This makes it possible to better utilize the capacity of the disks #0, #1 and #2.

The logical drive managing means 3 manages for each logical drive such management information as disk numbers attached to the logical drives, correlative information such as block numbers in the data area, and status information including capacities, performance levels and other array parameters of the disks #0, #1 and #2.

The disk storage area allocating means 4 controls access to the disks #0, #1 and #2. Commands are distributed by the allocating means 4 to each of the disks #0, #1 and #2, with logical addresses translated to physical addresses in accordance with the disk count, RAID level and stripe size.

The primary access log storing means 5 includes the primary log storage area 21 composed of a volatile or nonvolatile memory such as a DRAM. The storing means 5 stores on a primary basis into the primary log storage area 21 the contents of access from the host system 12 to the disks #0, #1 and #2, as well as the access sizes involved.

The secondary access log storing means 6 records on a secondary basis the primarily retained access logs from the primary log storage area 21 to the log storage area 18 of the disks #0, #1 and #2.

The access log analyzing means 7 is connected to a timer 22 that outputs start instructions periodically. When the timer 22 outputs a log analysis start instruction, the analyzing means 7 first checks to see if the current point in time is in a predetermined period for analysis. Access logs make cyclic use of predetermined areas on the disks #0, #1 and #2. Depending on how many times access commands have been output, the amounts of access logs held on the disks #0, #1 and #2 can vary even if analyzed periodically. Thus the access log analyzing means 7 starts analyzing logs only after a predetermined log cycle has passed.

After the predetermined log cycle has passed, the access log analyzing means 7 reads the access logs from the disks #0, #1 and #2 to analyze such access trends as sizes of access requests, access request counts, and accessed locations on the disks #0, #1 and #2.

Log analyses need not be started automatically. Instead, an analysis start instruction may be issued by a user to start the analyzing process.

Figure 3:
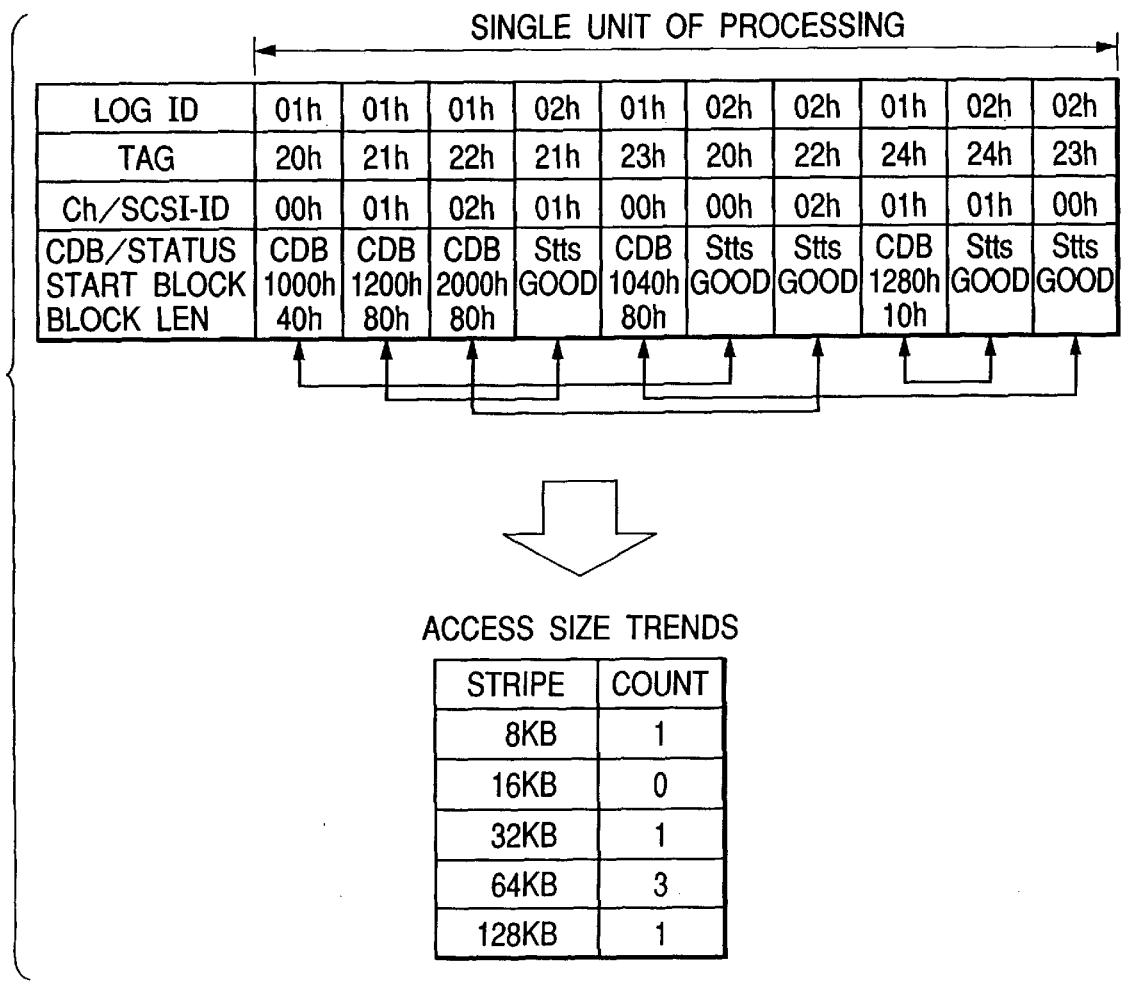
FIG. 3 is an explanatory view of typical access logs used by the embodiment.

FIGS. 3 and 4 show typical access logs analyzed by the access log analyzing means 7 of this embodiment.

Each of FIGS. 3 and 4 depicts a single unit of analysis that is shown proceeding chronologically from left to right in the figure.

In FIG. 3, "Log ID" denotes identifiers indicating the issue or the completion of a command. In this example, "01 h" stands for the issue of a command and "02 h" for the completion of a command.

In FIG. 3, "TAG" represents identifiers for indicating the order in which commands were issued to the disks #0, #1 and #2. As such, the TAG identifiers allow the sequence of the issued commands to be determined. When the controlling means 15 issues commands, the disks #0, #1 and #2 may or may not be accessed in the order in which the commands were issued. That is, the chronological order of the commands is altered in such a manner that the processing time will be the shortest. In other words, the commands may or may not end in the order in which they were issued. Thus the command-issuing entity furnishes each command with a TAG number so that each command may later be checked for its completion.

Also in FIG. 3, "Ch/SCSI-ID" represents bus numbers (SCSI channel numbers) together with SCSI device identifiers (i.e., of disks #0, #1 and #2). Specifically, "00 h" stands for the disk #0, "01 h" for the disk #1, and "02 h" for the disk #2. In the example of FIG. 3, all devices are shown to be connected to the same bus.

The acronym CDB in FIG. 3 stands for a Command Descriptor Block, i.e., a command in itself. "Start Block" denotes address locations on the disks #0, #1 and #2. "Block Len" represents the amount of area having been accessed.

Trends of the sizes of access to the disk group 2 are determined on the basis of the above-described parameters. Because one block size consists of 512 bytes, the size of, for example, 40 h corresponds to a stripe size of 32 KB (40 h×512 bytes=20 h×1 K bytes=32×1 K bytes=32 KB). Likewise, 10 h=8 KB and 80 H=64 KB.

From such analyses of the access logs, it maybe determined that the stripe size of at least 64 KB is suitable for the example in question, as illustrated in FIG. 4. In the new setup, the disks #0, #1 and #2 can be accessed in parallel, and continuous regions may also be accessed on the disks #0, #1 and #2.

Two typical methods for analyzing the access logs will now be described.

The first analyzing method involves analyzing data in the access logs on a time series basis. The unit of processing is set to be long enough for any one issued command to be completed therein (i.e., normally ended). The disk numbers, access locations and distribution of access sizes within the unit of processing are prepared, so that the disks #0, #1 and #2 are verified for validity in parallel and consecutive access.

The second analyzing method involves sorting and analyzing the data in the access logs in terms of access sizes. That is, the access sizes of the access logs are counted with respect to each of the stripe sizes supported. When the frequency with which the requested access sizes have occurred is known, the trends of access are grasped. The access logs may also be analyzed by statistical techniques.

The array parameter judging and changing means 8 will now be described.

The array parameter judging and changing means 8 judges the validity of existing array parameters in accordance with the result of analyses by the access log analyzing means 7. Any of the array parameters may be changed if judged necessary by the judging and changing means 8.

For example, if access is judged to have concentrated on discontinuous regions on some of the disks #0, #1 and #2, then the stripe size needs to be changed. If the access size tended to be smaller, the stripe size is made larger; if the access size tended to be larger, the stripe size is made smaller.

It may be found that parallel access operations on the disks #0, #1 and #2 were carried out in the same period in units of the stripe size. This means that a plurality of commands were not executed in parallel. In that case, the stripe size is enlarged.

If mass access operations were carried out sequentially on RAID 5, the RAID level is changed from RAID 5 to RAID 3.

The reconstructing means 9 reconstructs the logical disks #0, #1 and #2 on the basis of the array parameters altered by the array parameter judging and changing means 8. Specifically, the reconstructing means 9 reconstructs the data areas 17 on the disks #0, #1 and #2 as required.

Figure 5:
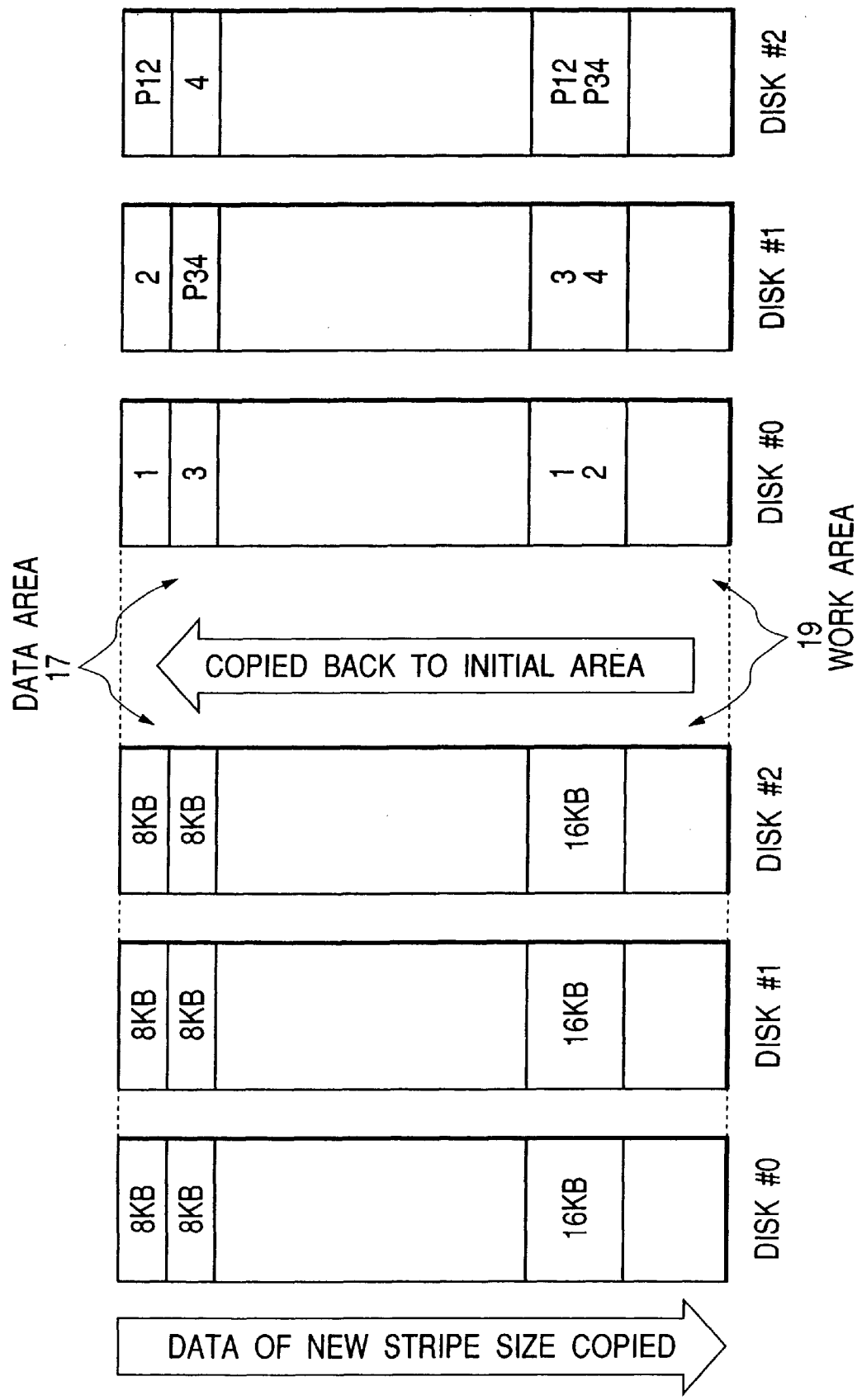
FIG. 5 is an explanatory view showing how disk data areas are typically reconstructed by reconstructing means of the embodiment.

How data areas are typically reconstructed by the reconstructing means 9 will now be described with reference to FIG. 5. The example of FIG. 5 involves having the old stripe size of 8 KB replaced by a new stripe size of 16 KB to reconstruct the data areas.

In this example, the data set beforehand in units of the old stripe size of 8 KB in the data areas 17 on the disks #0, #1 and #2 are first copied into the work areas 19 in increments of 16 KB, i.e., the new stripe size. In the work areas 19, the parity generating means 11 (to be described later) generates new parity using the new stripe size. With the new parity generated, the data are copied from the work areas 19 back to the initial data areas 17. This process is repeated for each of a number of stripes. Eventually the reconstruction is completed for all stripes.

If the stripe size is reduced for the reconstruction, the data in the data areas 17 are copied in increments of the old stripe size to the work areas 19. In the work areas 19, the parity generating means 11 generates new parity using a new stripe size. With the new parity thus generated, the data are copied from the work areas 19 back to the initial data areas 17.

The array parameter storing means 10 is intended to record newly established array parameters such as the stripe size to a nonvolatile memory.

The parity generating means 11 is designed to generate new parity when it is necessary to establish a new stripe size for the reconstruction of the logical disks #0, #1 and #2.

The controlling means 15 provides controls so that the above-described components function smoothly. Illustratively, the controlling means 15 controls a series of operations performed by various means: storage of access logs to the disks #0, #1 and #2; reading of the access logs from the disks and analysis of the retrieved logs; judging and changing of array parameters as needed; and reconstruction of the logical disks #0, #1 and #2.

The host system interface 13 adjusts differences in voltage, current and operation timing between the host system 12 and the disk array apparatus 1. In terms of software, the host system interface 13 controls the issuance of commands from the host system and their completion. The disk interface 13 adjusts differences in operation timing between the controlling means 15 and the disk group 2. As such, the disk interface 13 controls the SCSI bus on a software basis to interface with the disks.

A SCSI bus 23 is furnished interposingly between the disk interface 14 and the disk group 2. The bus allows signals to be sent from the controlling means 15 to the disk group 2.

How logical drives are typically reconstructed automatically by this embodiment will now be described with reference to FIG. 6.

When the host system 12 gains access to the disks #0, #1 and #2, the primary access log storing means 5 stores on a primary basis information about such access (access logs) to the primary log storage area 21. Later, the secondary access log storing means 6 places in a secondary fashion the access logs to the log storage areas 18 on the disks #0, #1 and #2 having been accessed.

Figure 6:
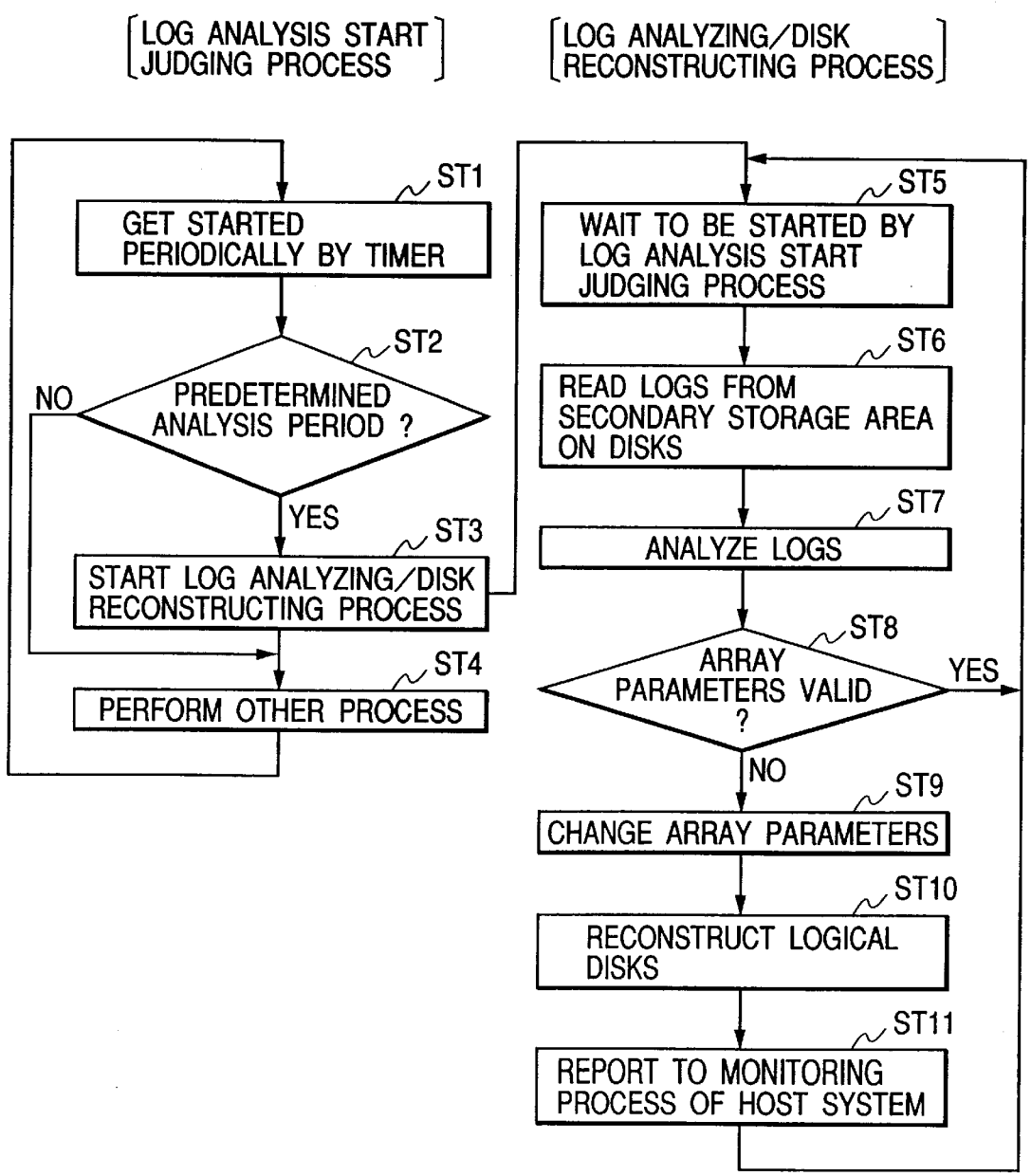
FIG. 6 is a flowchart of steps in which disk data areas are reconstructed automatically by the embodiment.
Figure 7B:
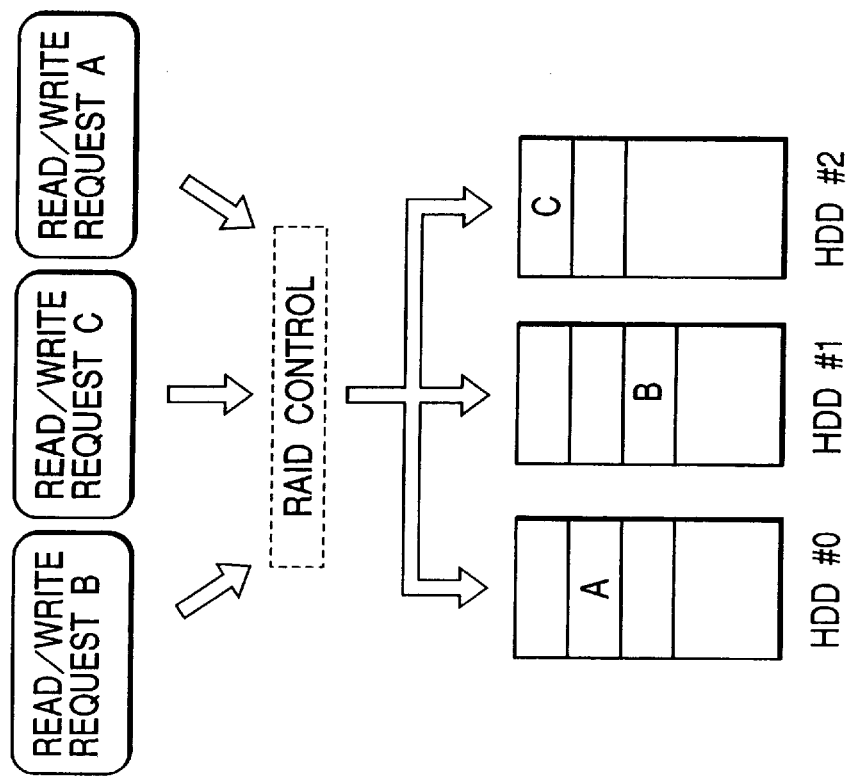
FIG. 7B is an explanatory view showing how a plurality of read or write instructions are processed conventionally.
Figure 7A:
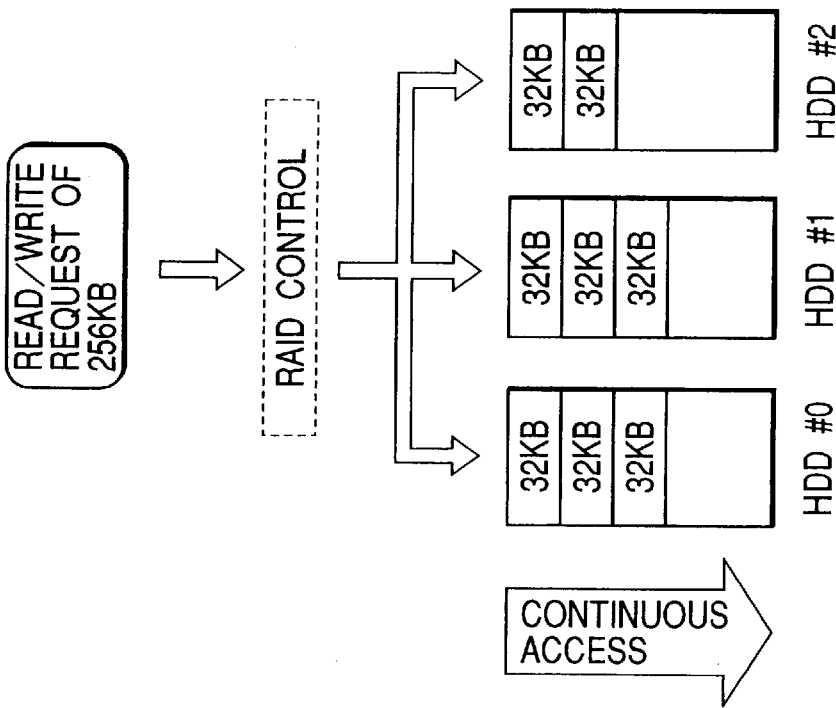
FIG. 7A is an explanatory view showing how a mass read or write instruction is processed by a conventional disk array apparatus.
Figure 8B:
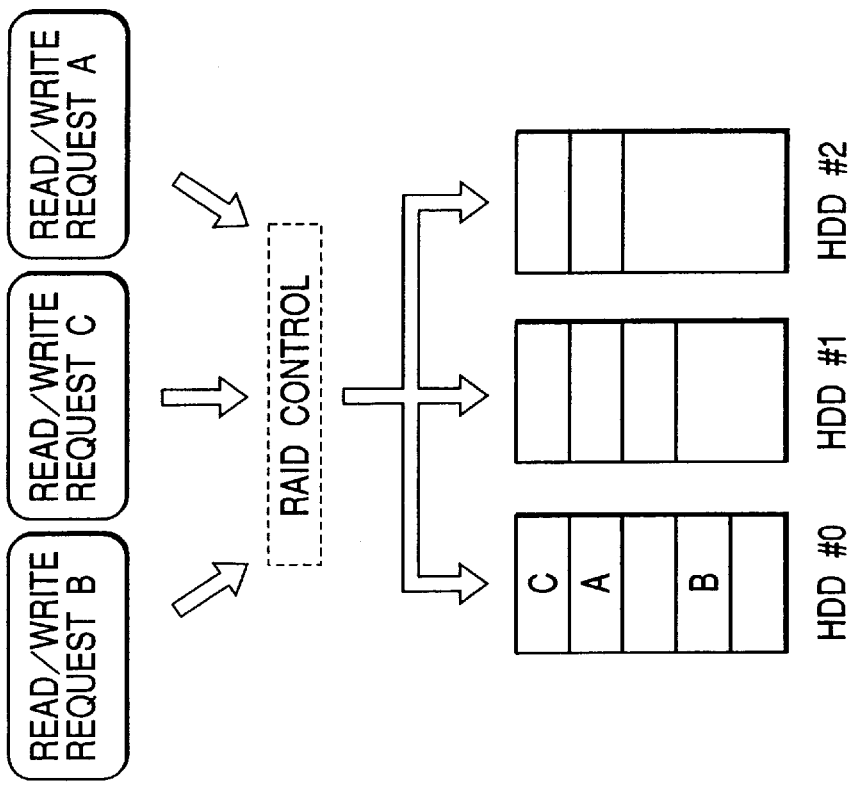
FIG. 8B is an explanatory view showing how a plurality of small-capacity read or write instructions are processed conventionally regarding a specific disk.
Figure 8A:
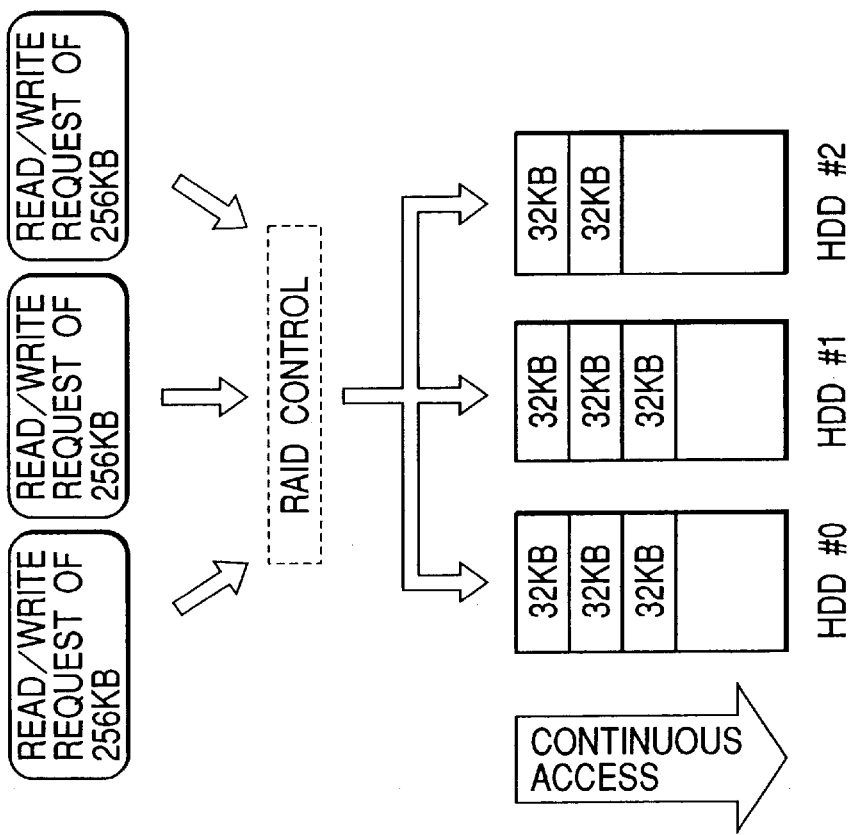
FIG. 8A is an explanatory view showing how a plurality of mass read or write instructions are processed conventionally.

In step ST1 of FIG. 6, the access log analyzing means 7 is started periodically by the timer 22. In step ST2, a check is made to see if a predetermined analysis period is reached for each of the disks #0, #1 and #2. The analysis periods are established beforehand illustratively on the basis of access counts or access sizes.

If the predetermined analysis period is judged to be reached ("YES" in step ST2), step ST3 is reached. If the analysis period is yet to be reached ("NO" in step ST2), step ST4 is reached.

In step ST3, the access logs are analyzed, and task-to-task communicating means issues signals for starting the analysis of the access logs and the reconstruction of the data areas on the disks #0, #1 and #2. Step ST5 is then reached.

When step ST4 is reached, some other appropriate processing is carried out and step ST1 is reached again to form a closed loop. The result of a check on the next analysis period is then awaited.

In ST5, a start instruction is awaited from the access log analysis start judging process situated upstream. When the instruction is received, step ST6 is reached in which the access long analyzing means 7 reads the access logs from the disks #0, #1 and #2. Step ST6 is followed by step ST7.

In step ST7, the access log analyzing means 7 starts analyzing the access logs. Step ST7 is followed by step ST8.

In step ST8, the array parameter judging and changing means 8 checks such array parameters as the stripe size, disk count and RAID level for validity. If the check reveals that the array parameters are valid, there is no need to change the array parameters and step ST5 is reached again. If any array parameter is judged invalid, step ST9 is reached.

In step ST9, the array parameter in question is changed. The newly established array parameter is stored by the array parameter storing means 10 into an appropriate area, and step ST10 is reached.

In step ST10, the reconstructing means 9 reconstructs the data areas 17 on the disks #0, #1 and #2 in accordance with the changed array parameter. If the stripe size needs to be altered, the parity generating means 11 generates new parity so that a new stripe size is reconstructed.

In step ST11, a monitoring process of the host system 12 is notified of the reconstruction. Step ST11 is followed by step ST5 to complete a closed loop. The next access log analysis start judging process is then awaited.

This embodiment, as described, allows optimum array parameters to be determined depending on disk access trends without stopping the host system 12. The data areas 17 on the disks #0, #1 and #2 are then reconstructed in keeping with the newly determined array parameters.

Specificities in the description above should not be construed as limiting the scope of the invention but as merely providing illustrations of a preferred embodiment of this invention. Alternatives, modifications and variations may be made without departing from the spirit or scope of the claims that follow.

As described, the disk array apparatus according to the invention allows optimum array parameters to be determined in accordance with disk access trends without deactivating the host system. The data areas on the configured disks are then reconstructed accordingly.

The log storage area and the work area may be provided in one region in each of the storage devices. This preferred structure permits effective use of the storage device capacity.

What is claimed is:

1. A disk array apparatus comprising:

a plurality of storage devices accessed in parallel by said disk array apparatus, each of said storage devices including a data area established beforehand in units of a stripe size, a log storage area for accommodating logs of access to said storage devices, and a work area in which changing operation of said data area of said storage devices is carried out;

access log storing means for storing the access logs to said log storage areas;

access log analyzing means for analyzing trends of access to each of said storage devices on the basis of said access logs;

array parameter judging and changing means for judging whether existing array parameters are valid on the basis of results of analysis from said access log analyzing means, said array parameter judging and changing means further establishing optimum array parameters to replace said existing array parameters if said existing array parameters are judged invalid; and reconstructing means for reconstructing said data area of each of said storage devices in accordance with said optimum array parameters established by said array parameter judging and changing means.

2. A disk array apparatus according to claim 1, wherein, if said array parameter judging and changing means judges it necessary to enlarge said stripe size as one of said array parameters, said reconstructing means causes stored data to be copied from said data area into said work area in units of a new stripe size in each of said storage devices, said reconstructing means further generating new parity based on said new stripe size in said work area before copying said stored data from said work area back to the original data area, whereby said data area is reconstructed in each of said storage devices.

3. A disk array apparatus according to claim 1, wherein, if said array parameter judging and changing means judges it necessary to reduce said stripe size as one of said array parameters, said reconstructing means causes stored data to be copied from said data area into said work area in units of the old stripe size in each of said storage devices, said reconstructing means further generating new parity based on a new stripe size in said work area before copying said stored data from said work area back to the original data area, whereby said data area is reconstructed in each of said storage devices.

4. A disk array apparatus according to claim 1, wherein said log storage area and said work area are provided in one region in each of said storage devices.

* * * * *